W. L. MAJORS.
ANTISKID DEVICE.
APPLICATION FILED MAR. 24, 1920.

1,422,285. Patented July 11, 1922.

Inventor:
Walter L. Majors,
By Hugh H. Wagner,
Atty.

UNITED STATES PATENT OFFICE.

WALTER L. MAJORS, OF ST. LOUIS, MISSOURI.

ANTISKID DEVICE.

1,422,285. Specification of Letters Patent. Patented July 11, 1922.

Application filed March 24, 1920. Serial No. 368,352.

*To all whom it may concern:*

Be it known that I, WALTER L. MAJORS, a citizen of the United States, residing at the city of St. Louis, in the State of Missouri, have invented certain new and useful Improvements in Antiskid Devices, of which the following is a specification.

This invention is a device for preventing motor-vehicles or the like from skidding, and consists in means adapted gently to take hold of the tires on the rear wheels, which exercises a certain retarding effect, after which the wheels rotate the said device or devices until the same come in contact with the road and lift the wheels therefrom, which, of course, stops the car as well as the skidding.

The device is operated by a pair of pedals, one to throw the antiskidding device into action and the other to return it to its normal inactive position.

In the accompanying drawings forming part of this specification, in which like numbers of reference denote like parts wherever they occur, Figure 1 is a side elevation;

Figure 1:
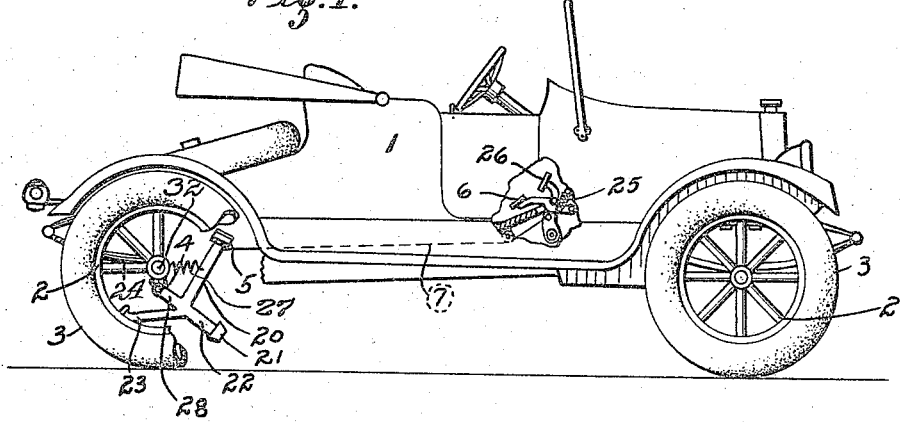
Figure 2:
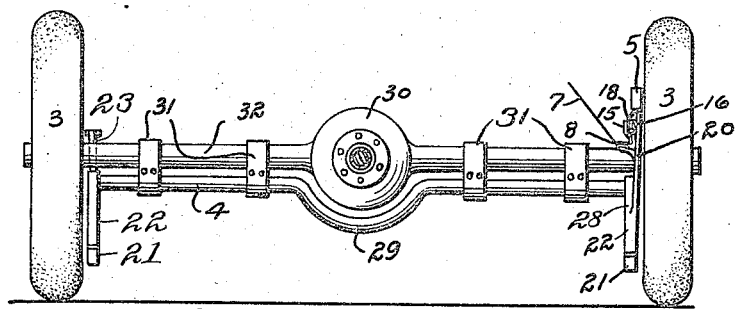
Figure 2 is a rear elevation.

The motor-vehicle 1 is provided with the usual wheels 2 and tires 3.

Its shaft 4 extends approximately the width of the car, so as simultaneously to actuate its tire-griping members 5 on both sides of the car. As is well known, any force applied to one of the rear wheels and not the other would accentuate instead of prevent skidding.

In operation when the driver notices an inclination to skid he presses with his foot upon pedal 6, which causes an unloosening or slackness of cable 7, which passes over sheave or pulley 8 mounted by pin 9 or bracket 10.

Bracket 10 is borne by member 11 from which projects lug 12 to which at 13 is pivoted lever 14.

The end of lever 15 overlies spring 16 as does also the end 17 of lever 18, which is pivoted at 19 to member 11 and carries on its outer end grip 5.

Figure 3:
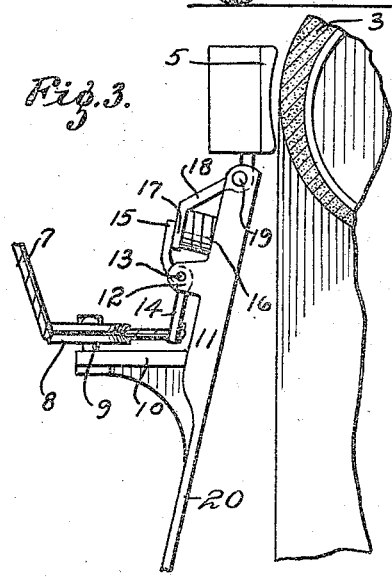
Figure 3 is a rear elevation on an enlarged scale.

When the rope is taut, as shown in Figure 3, the end 15 of lever 14 presses upon the end 17 of lever 18, with the result that grip 5 is kept out of engagement with tire 2. When, however, pedal 6 is depressed and thereby cable 7 slackened, the spring pressure of spring 16 instantly rocks lever 18 on pivot 19, thereby grip 5 is forced into contact with tire 3. It is to be understood that this operation is by means of shaft 4 simultaneously performed on the wheel on the opposite side of the car at the same time.

Figure 4:
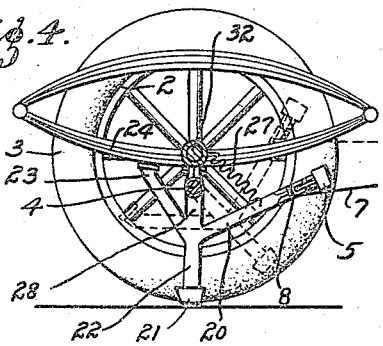
Figure 4 is a side elevation on an enlarged scale showing this device in action.

When grip 5 engaging its respective tire 3 is thus in contact, the forward rotation of tires 3 causes forward movement of arm 20 until foot 21 touches the ground as shown in Figure 4, said rotation being on shaft 4 as a pivot. Arm 22 bears such angular relation to arm 20 that contacts with the tire and to arm 23 that, just as foot 21 engages the ground, the end of arm 23 comes in contact with the vehicle spring 24, and the wheels of the vehicle are thereby lifted from the ground, thus terminating the skid and at the same time limiting or terminating further forward or other movement of the car by reason of the drag on feet 21.

A spring 25 normally keeps pedal 6 in a raised position and therefore cable 7 taut.

The pedal 26 is a return pedal for returning the parts to initial or normal position, in which action it is assisted by return spring 27.

Arms 22 and 23 must be of such length and so proportioned with the other arm 28 that when foot 21 strikes the ground it will hoist the wheels off the ground, while further movement or rotation of the assembly or spider is prevented by the engagement of the end of arm 23 with vehicle spring 24.

Shaft 4 is bent at 29 so as to pass the differential 30 and is loosely mounted by bands 31 on axle 32.

The dotted lines in Figure 4 depict the spider in initial position, the same as shown in full lines in Figure 1; while the full lines in Figure 4 denote its final position.

Having thus described this invention, I hereby reserve the benefit of all changes in form, arrangement, order, or use of parts, as it is evident that many minor changes may be made therein without departing from the spirit of this invention or the scope of the following claims.

I claim:

1. In a device of the character described, the combination of a pair of rotary spiders, a shaft with which they move in unison, and means for actuating the same, the said actuating means consisting of a tire grip.

2. In a device of the character described, the combination of a pair of rotary spiders, a shaft with which they move in unison, means for actuating the same, the said actuating means consisting of a tire grip, and means for forcing the same into contact with the tires.

3. In a device of the character described, the combination of a pair of rotary spiders, a shaft with which they move in unison, means for actuating the same, the said actuating means consisting of a tire grip, means for forcing the same into contact with the tires, and a pedal for setting the parts in motion.

4. In a device of the character described, the combination of a pair of rotary spiders, a shaft with which they move in unison, means for actuating the same, the said actuating means consisting of a tire-grip, means for forcing the same into contact with the tires, the said spiders having each thereon such tire-grip, and an arm for hoisting the car.

5. In a device of the character described, the combination of a pair of rotary spiders, a shaft with which they move in unison, means for actuating the same, the said actuating means consisting of a tire-grip, means for forcing the same into contact with the tires, the said spiders having each thereon such tire-grip, an arm for hoisting the car, and a stoparm.

6. In a device of the character described, comprising a shaft mounted upon the axle and extending approximately the distance between a pair of wheels, a pair of spiders adapted to rotate in unison with the said shaft and with each other and located respectively adjacent to one of the said wheels, a tire-grip borne by one of the arms of each of the said spiders, a pivoted member to which the said tire-grip is attached, the said member being pivoted to the said arm, a spring borne by the said arm adapted to exert force upon the said lever when force restraining the said spring is released and means for releasing the said spring.

7. In a device of the character described, comprising a shaft mounted upon the axle and extending approximately the distance between a pair of wheels, a pair of spiders adapted to rotate in unison with the said shaft and which each other and located respectively adjacent to one of the said wheels, a tire-grip borne by one of the arms of each of the said spiders, a pivoted member to which the said tire-grip is attached, the said member being pivoted to the said arm, a spring borne by the said arm adapted to exert force upon the said lever when force restraining the said spring is released and means for releasing the said spring, the said releasing means consisting of a cable held normally taut and a pivoted lever adapted while the said cable is taut to restrain the force of the said spring.

8. In a device of the character described, the combination of a pair of spiders adapted to act in unison upon opposite wheels each of the said spiders being pivoted so as to be adapted to rotate, and means borne thereby adapted to engage the wheels whereby the said rotation is caused, the arms of the said spiders being so proportioned as to length that one of the same will rotate to the point of striking the ground under impulsion of the aforesaid contact with the tire of another arm.

9. In a device of the character described, the combination of a pair of spiders adapted to act in unison upon opposite wheels each of the said spiders being pivoted so as to be adapted to rotate, and means borne thereby adapted to engage the wheels whereby the said rotation is caused, the arms of the said spiders being so proportioned as to length that one of the same will rotate to the point of striking the ground under impulsion of the aforesaid contact with the tire of another arm, while another one of the said arms will act as a stop to prevent further rotation at the time when the said other arm makes contact with the ground.

In testimony whereof I hereunto affix my signature.

WALTER L. MAJORS.